W. FARMER.
FRUIT PICKER.
APPLICATION FILED MAR. 17, 1914.
1,100,965. Patented June 23, 1914.
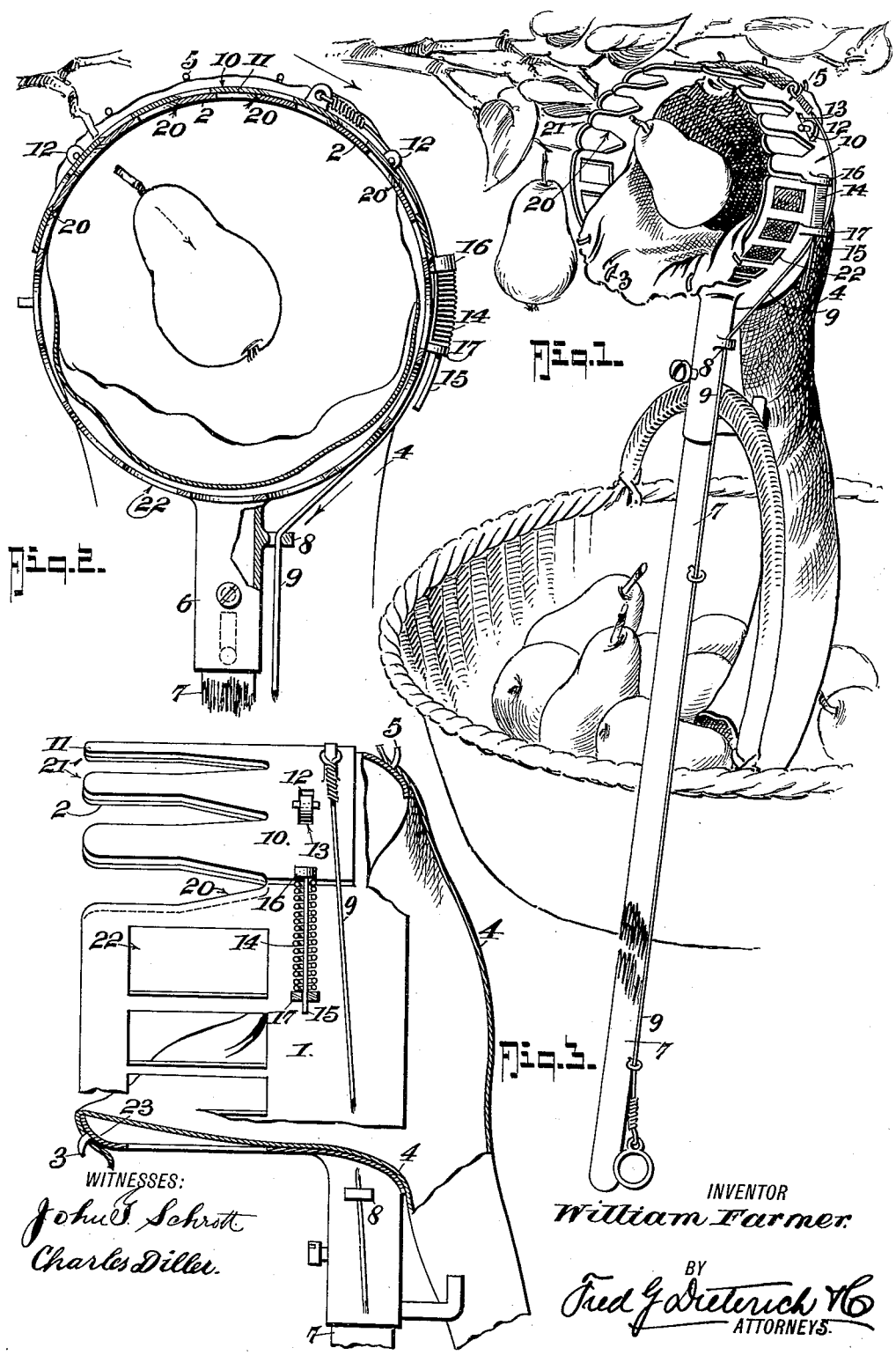

UNITED STATES PATENT OFFICE.

WILLIAM FARMER, OF ALTAVISTA, VIRGINIA, ASSIGNOR OF ONE-FOURTH TO THOMAS HASKINS AND ONE-FOURTH TO FRANK STEVENS, BOTH OF ALTAVISTA, VIRGINIA.

FRUIT-PICKER.

1,100,965.  Specification of Letters Patent.  Patented June 23, 1914.

Application filed March 17, 1914. Serial No. 825,341.

*To all whom it may concern:*

Be it known that I, WILLIAM FARMER, residing at Altavista, in the county of Campbell and State of Virginia, have invented certain new and useful Improvements in Fruit-Pickers, of which the following is a specification.

My invention, which comprehends certain improvements in that type of fruit picking or dislodging means carried by a pole, by which, while the operator stands upon the ground, the fruit can be easily severed from the tree branches and conducted through a suitable chute into a receptacle held upon the pole.

The primary object of my invention is to provide a fruit picker of a simple and inexpensive construction, that can be conveniently and effectively manipulated and in which the picking elements are such that the cutter head does not need to be exactly positioned with respect to the fruit stems, as is required in many of the different types of fruit pickers now in use, and in which the said head is formed with a large number of cutting fingers or teeth so arranged that the operator can quickly adjust the picker head in position for gathering the fruit.

Another object of my invention is to provide an improved fruit picker of the general type stated, in which the picker head includes an improved coöperative arrangement of the stationary and movable members whereby to provide for properly holding the two parts in operative connection and to provide for conveniently attaching the mouth of the chute or bag, into which the picked fruit is dropped and by which it is conveyed to the basket or other fruit collecting receptacle.

With still further objects in view that will hereinafter be apparent, my invention consists in the peculiar arrangement and novel combination of parts, all of which will be hereinafter fully explained, specifically pointed out in the appended claims and illustrated in the accompanying drawing, in which:—

Figure 1 is a perspective view of my improved fruit picker the same being shown in use. Fig. 2 is a cross section of the picker head. Fig. 3 is a transverse section thereof.

In carrying out my invention, I employ a cylindrical member or band 1, preferably of aluminum, the upper half portion of one end of which is cut out to form a number of picker fingers or teeth 2, one side of each of which is tapered to form a shearing or cutting edge 20, and their outer ends are rounded as at 21, to facilitate the entrance of the said teeth or fingers, over the fruit stems and branches without danger of breaking the said branches or bruising the fruit. The space between the fingers taper to a V shape to insure a positive grip or hold on the stem when projecting the toothed edge of the head thereover. To lighten the weight of the said head, the bottom portion of the cylindrical member or band is formed with a series of cut outs or openings 22, and the front edge of the said lower portion is curved inwardly to produce a flange 23, the width of which gradually decreases from the center toward the ends thereof. The flange 23 provides for positioning a series of hooks 3 thereon to which the lower edge of the mouth of the bag or chute 4 may be positively secured. To facilitate the drop of the cut fruit down into the bag, the upper edge of the mouth of the bag is secured upon the hooks 5 on the upper rear edge of the member 1. The member 1 is provided with a long socket 6 for receiving the upper end of the pole 7 and the said socket has a guide eye 8 for the pull cord or cable 9 presently again referred to.

10 designates an outer cutting member of substantially semi-circular shape that encircles the other or inner member 1 and the said cutting member 10 is formed with cutting fingers or teeth 11 shaped like the teeth on the member 1, which, when the outer member is moved in the manner presently explained, coacts with the cutting teeth or fingers on the said inner member 1. To hold the member 10 upon and permit of a free endwise or sliding movement on the said member 1, the latter has lugs or keepers 12 that project through the elongated slots 13 in the member 10 as is clearly shown in Fig. 1. The outer cutting element 10 is moved to effect a fruit cutting operation by the pull cord or cable 9 that connects with an apertured lug on the member 10 passes through the guide eye 8 on the socket 6 and extends down for convenient operation by the picker.

Normally the outer member 10 is held in the inner member 1 that the cutting teeth or fingers aline to leave the spaces between the cutting fingers free to allow for readily shoving the picker head into position to properly engage with the fruit stems and for holding the said member in the position stated, a coiled spring 14 is provided, that takes around a bent rod 15 made fast to a lug 16 on the member 10 and which is slidably guided in an apertured lug 17 on the inner member 1.

By reason of constructing and arranging the several parts as shown and described and which constitute my complete fruit picking appliance, when using the same the toothed side of the head is applied to receive the piece of fruit, it being understood since the spaces between the teeth taper to a wedge shape that the stem can be positively guided to a proper position for being cut, which operation is effected by giving a quick and strong pull on the pull cord, it being obvious that in doing this the spring is compressed and when the strain on the cord is released the movable cutter member is returned to normal position by the spring tension.

What I claim is:—

1. In a fruit picker, a cylindrical body a portion of one end of which is provided with slots to form fingers and the remaining portion of the said end forming a bottom, the other end of the said body being smooth, and having a pendent socket, a staff secured in the said socket, a semi-cylindrical band knife that includes a smooth body part and cutting fingers that fit over the cylindrical body, means for retaining the said band knife in place a spring for pressing the said band knife to the "open" position and a pull cord for moving the said band knife to effect the cutting action, and a sack having its mouth projected into the said cylindrical body and held in a diagonal plane extending from the lower front end to the upper rear end of the said cylindrical body.

2. A fruit picker comprising a picker head that includes an inner cylindrical band having spaced fingers on one end of the upper portion thereof, the said end, at the lower portion being smooth and formed with an integral pendent pole receiving socket an outer band-like member having a fingered edge for coöperating with the fingers on the inner band, the said outer band-like member encircling the said fingered portion of the inner band, manually operated means for operating the outer band in one direction, and other means for automatically moving the said outer band in the opposite direction and a receiver connected with the inner member and having a portion of its mouth extended over and secured to the smooth lower front end of the inner member.

3. In a fruit picker of the character described; a picker head consisting of an inner cylindrical band, an outer semi-circular band that encircles the top of the inner band and has endwise movement thereon, the front ends of the two parts having coinciding spaced slots and picker fingers the edges of which are shaped to form shearing members, means for holding the outer band open, a spring connection that normally shifts the outer band to bring the fingers to the "open" position, a pull device connected to the said outer band for moving it to its stem cutting position and a bag having its mouth projected into the inner cylindrical means on the front lower end of the said inner band for securing the lower edge of the bag mouth and other means on the upper rear end of the inner band for securing the upper end to the bag mouth.

WILLIAM FARMER.

Witnesses:
 THOS. H. HASKINS,
 R. F. SHORT.